(12) United States Patent
Evenden et al.

(10) Patent No.: US 8,818,815 B2
(45) Date of Patent: Aug. 26, 2014

(54) METHOD AND SYSTEM FOR PACKETISED CONTENT STREAMING OPTIMISATION

(75) Inventors: Richard J Evenden, Suffolk (GB); Francis J Scahill, Suffolk (GB)

(73) Assignee: British Telecommunications, London (GB)

( * ) Notice: Subject to any disclaimer, the term of this patent is extended or adjusted under 35 U.S.C. 154(b) by 1706 days.

(21) Appl. No.: 11/658,562

(22) PCT Filed: Jul. 27, 2005

(86) PCT No.: PCT/GB2005/002967
§ 371 (c)(1),
(2), (4) Date: Jan. 25, 2007

(87) PCT Pub. No.: WO2006/010937
PCT Pub. Date: Feb. 2, 2006

(65) Prior Publication Data
US 2008/0312922 A1 Dec. 18, 2008

(30) Foreign Application Priority Data
Jul. 27, 2004 (GB) .................................. 0416720.1

(51) Int. Cl.
*G10L 21/00* (2013.01)
(52) U.S. Cl.
USPC ...................................................... 704/270.1
(58) Field of Classification Search
USPC .............................................. 704/270.1, 275
See application file for complete search history.

(56) References Cited

U.S. PATENT DOCUMENTS 5,040,212 A * 8/1991 Bethards ........................ 704/246
5,054,082 A * 10/1991 Smith et al. ................... 704/275

(Continued)

FOREIGN PATENT DOCUMENTS

EP 0936772 A2 8/1999
EP 1065857 A3 4/2003

(Continued)

OTHER PUBLICATIONS
International Preliminary Report and Written Opinion issued Jan. 30, 2007 in corresponding International Application No. PCT/GB2005/002967.

(Continued)

*Primary Examiner* — Michael N Opsasnick
(74) *Attorney, Agent, or Firm* — Nixon & Vanderhye P.C.

(57) ABSTRACT

A method of determining the speech content of a packet carrying speech encoded data missing from speech segment communicated by in a packetized data stream communicated using at least one VOIP link between a server platform and a client platform, the method comprising at the client platform: receiving a plurality of packets carrying speech encoded data forming said packetized data stream; processing each received packet to determine a unique message segment identifier associated with a speech segment of the received packet; processing each received packet to determine if it contains another unique message segment identifier associated with a previously received packet carrying encoded speech data; determining if the unique message segment identifier for the received packet exists in storage means provided on the client platform, and if not, storing the received packet in association with its unique message segment identifier; processing each received packet to determine a sequence identifier; checking if the sequence identifier is contiguous in sequence with a previously received packet stored locally on said client platform, and if not, determining the speech content of one or more missing packet in the sequence sent by the server platform to the client platform by retrieving a packet from said storage means having the same unique message segment identifier as the missing packet.

8 Claims, 3 Drawing Sheets

(56) References Cited

U.S. PATENT DOCUMENTS

| | | | |
|---|---|---|---|
| 5,546,395 A | 8/1996 | Sharma et al. | |
| 5,745,871 A | 4/1998 | Chen | |
| 5,855,003 A * | 12/1998 | Ladden et al. | 704/270 |
| 6,240,387 B1 | 5/2001 | DeJaco | |
| 6,356,545 B1 | 3/2002 | Vargo et al. | |
| 6,581,032 B1 | 6/2003 | Gao et al. | |
| 6,757,654 B1 | 6/2004 | Westerlund et al. | |
| 6,785,261 B1 | 8/2004 | Schuster et al. | |
| 6,851,084 B2 * | 2/2005 | Pattavina | 714/776 |
| 7,020,263 B2 * | 3/2006 | Bauer et al. | 379/219 |
| 7,542,907 B2 * | 6/2009 | Epstein et al. | 704/275 |
| 7,610,204 B2 * | 10/2009 | Ruback et al. | 704/277 |
| 2002/0184373 A1 | 12/2002 | Maes | |
| 2003/0088421 A1 | 5/2003 | Maes et al. | |
| 2004/0032860 A1 | 2/2004 | Mundra et al. | |
| 2004/0107092 A1 | 6/2004 | Harada | |
| 2004/0136509 A1 | 7/2004 | Reynolds | |
| 2004/0258079 A1 | 12/2004 | Fushimi et al. | |

FOREIGN PATENT DOCUMENTS

| | | |
|---|---|---|
| EP | 1202251 A3 | 9/2003 |
| EP | 1453244 A2 | 9/2004 |
| JP | 4-160953 | 6/1992 |
| JP | 2003-18240 | 1/2003 |
| WO | WO 01/54116 A1 | 7/2001 |
| WO | WO 02/30098 A3 | 4/2002 |
| WO | WO 03/047115 A1 | 6/2003 |
| WO | WO 03/092232 A1 | 11/2003 |
| WO | WO 2004/040830 A1 | 5/2004 |

OTHER PUBLICATIONS

GB Search Report dated Nov. 22, 2004.
GB Search Report Jan. 17, 2005.
International Search Report and Written Opinion of the International Search Authority dated Dec. 6, 2005.
Audio-Video Transport Working Group H Schulzrinne GMD Fokus S Casner Precept Software et al: "RTP:A Transport Protocol for Real-Time Appiations" RFC 1899, Jan. 1996, XP015007673, ISSN: 0000-0003.
Fielding et al., "Hypertext Transfer Protocol—HTTP/1.1" Network Working Group, Standards Track, 1999, pp. 1-114.

* cited by examiner

METHOD AND SYSTEM FOR PACKETISED CONTENT STREAMING OPTIMISATION

This application is the US national phase of international application PCT/GB2005/002967, filed 27 Jul. 2005, which designated the U.S. and claims benefit of GB 0416720.1, dated 27 Jul. 2004, the entire contents of each of which are hereby incorporated by reference.

BACKGROUND

1. Technical Field

The invention relates to a method and system for packetised content streaming in which content is segmented at a server into potentially repeatable parts in a content stream sent by the server platform to a remote client platform. Examples of packetised content streams include Voice Over Internet Protocol (VOIP) streaming. The invention in particular but not exclusively further relates to a method and system for mobile VOIP optimisation in an Interactive Voice Recognition (IVR) environment.

2. Description of Related Art

The concept of communicating with VOIP clients such as personal computers (PCs) using wired connections whether permanent (e.g. LAN based), always-on (e.g. broadband) or dial-up is well known. Several codecs are available for VOIP clients to encode speech packets over wired connections which are compatible with the characteristics of wired internet protocol (IP) and which support audio streaming with good speech quality of service (QoS).

However, when a mobile VOIP client is used to communicate in a wireless environment, for example, such as over a General Packet Relay Service (GPRS) network, new link characteristics are introduced which affect the perceived QoS. For example, in a wireless environment there is generally a reduction in bandwidth compared with that available over a wired environment. Packet latency may increase (for example, delays of 1 to 2 seconds may be perceived at each end of the transmission) and packet loss may increase. Moreover, the codecs used in GPRS generally need to be less bit-rate intensive than those used for a wired environment as the IP over GPRS charging is often based on the amount of data sent (e.g., by the byte).

BRIEF SUMMARY OF PRESENT EXAMPLE EMBODIMENTS

The present invention seeks to provide a method and system for client-server VOIP streaming optimisation which mitigates and/or obviates one or more of the above disadvantages. In particular, but not exclusively, the invention seeks to provide a means to predict at the server an optimal hash for a mobile VOIP client to use to encode speech packets sent as part of an interaction with an Interactive Voice Recognition (IVR) platform.

A first aspect of the invention seeks to provide a method of processing content data at a server platform into content segments capable of being sequentially associated, said content segments being selected to ensure at least one content segment is repeated in any given stream of content segments sent by said server platform to a client platform, the method comprising: associating each content segment with a unique content segment identifier; associating each unique content segment identifier with an associated packet identifier; associating each packet identifier with a sequentially contiguous packet identifier, the method of processing performed at the server platform enabling the client platform to determine for each packet it receives in a sequential stream of packets from said server platform over a connectionless communications link, said packets providing a stream of content segments, if a received packet is sequentially contiguous with a previously received packet, and if not, to determine from a packet identified by the sequential packet identifier of said received packet, the packet identifier of a contiguous packet in said sequential stream of packets sent by said server platform.

Preferably, the content stream is segmented into segments of which have a high probability of being repeated in the content stream. The segments may not be of equal size or duration. For example, in an interactive voice recognition scheme, content segments may be equivalent to the messages generated by the IVR prompts and responses to user input. There is likely to be a high rate of repetition of identical response sequences both during a single session, and when a user repeatedly accesses the IVR system over a prolonged period of time (e.g. over multiple sessions).

Advantageously, by storing the content segments with packet and content segment identifiers at the client platform, it is possible to determine at the client platform if a packet has been lost from the data stream sent by the server platform, and for the client platform to identify the content of the packet that has not been received or which has been received but failed to meet one or more quality-related criteria for the reception to be valid.

Preferably, the method further comprises the steps of: associating each content segment identifier with a sequentially contiguous content segment identifier, the method further enabling a client platform to determine for each content segment it receives in a sequential stream of content segments, if the content segment received is sequentially contiguous with a previously received content segment, and if not, to determine from a content segment identified by the sequential content segment identifier of said received content segment, the content identifier of a contiguous content segment in said content segment stream.

A second aspect of the invention seeks to provide a method of restoring content data at a client platform, the content data comprising data processed at a server platform according to the above first aspect, wherein the method of restoring content data comprises the steps of: at the client platform, receiving a packetised data stream; processing the received data stream to store for each received packet identifier, one or more sequentially contiguous packet identifiers and one or more unique content segment identifiers in association with the content segments identified by said unique content segment identifiers in a data store; determining for each received sequential packet identifier:

a) if the sequential packet identifier matches the packet identifier of the contiguously previous packet received at the client platform,
  and if not,
  b) substituting content segment retrieved from said data store, the retrieved content segment being associated with a packet identified by said sequential packet identifier as contiguous to said received packet in the stream sent by said server platform.

Preferably, the method further comprises the step of:

c) determining if the sequential packet identifier for the packet associated with said retrieved content segment matches the packet identifier of the contiguously previous packet received at the client platform and if not, repeating said steps a) to c).

Preferably, the method further comprises the steps of: processing the received data stream to store for each received content segment identifier, one or more sequentially contiguous content segment identifiers in said data store; and determining for each received sequential content segment identifier:
  a) if the sequential content segment identifier matches the content segment identifier of the contiguously previous content segment received at the client platform, and if not,
  b) substituting content segment retrieved from said data store, the retrieved content segment being associated with said sequential content segment identifier.

Preferably, the method further comprises the step of:
  c) determining if the sequential content segment identifier for the packet associated with said retrieved content segment matches the content identifier of the contiguously previous content segment received at the client platform and if not, repeating said steps a) to c).

Preferably, said connectionless communications link supports Internet Protocol communications between said server and said client platforms.

Preferably, said server platform comprises an interactive voice recognition platform arranged to generate automated messages and to process content segments received from said client platform.

Preferably, said Internet Protocol communications comprises Voice over Internet Protocol communications, and a said content segment comprises a speech encoded message segment generated by said server platform.

Preferably, each content segment is encoded using a codec determined by the complexity of the content data encoded at the server.

Preferably, each content segment comprises speech content and the codec used to encode said speech content is determined by the grammar complexity of the encoded speech segment.

Preferably, each packet carrying one or more content segments is further associated with a codec identifier to be used by the client platform to encode a response to each said content segment stream received from said server platform.

A third aspect of the invention seeks to provide a method of determining the speech content of a packet carrying speech encoded data sent by a server platform in a packetised data stream communicated to a client platform, the method comprising at the client platform:
  receiving said packetised data stream comprising a plurality of packets carrying speech encoded data;
  processing each received packet to determine a unique message segment identifier associated with a speech segment of the received packet;
  processing each received packet to determine if it contains another unique message segment identifier associated with a previously received packet carrying encoded speech data;
  determining if the unique message segment identifier for the received packet exists in storage means provided on the client platform, and if not, storing the received packet in association with its unique message segment identifier;
  processing each received packet to determine a sequence identifier;
  checking if the sequence identifier is contiguous in sequence with a previously received packet identifier associated with content stored locally on said client platform, and if not, determining the speech content of one or more missing packet in the sequence sent by the server platform to the client platform by retrieving content associated with the same unique message segment identifier as the packet identified as previously contiguous by said received packet sequence identifier.

Preferably, said communications link supports a connectionless communications protocol, for example, the internet protocol (IP).

Preferably, said communications link comprises a communications link supporting at least one wireless voice over internet protocol (VOIP), and said client platform comprises a mobile VOIP client platform.

Preferably, said memory means comprises a cache provided on said client platform.

Preferably, said server platform is an interactive voice recognition platform, and said predetermined condition is the expiry of a sequence of packets sent to the IVR platform by the client platform in response to a voice prompt sent by the IVR platform to the client platform.

Preferably, said message segment identifier comprises a hash code and said step of determining if the unique message segment identifier for the received packet exists in storage means provided on the client platform comprises client platform processing means performing a look-up function.

Preferably, each packet received further includes a codec identifier indicating an encoding scheme the client platform uses to encode subsequent speech segments which are sent by the client platform to said server platform in response to the said received data stream.

Preferably, said steps of processing to determine the sequence identifier, checking and determining the speech content are repeated until a predetermined condition is met.

Preferably, the predetermined condition is the codec identifier is updated. Alternatively, the predetermined condition is the sequence expires.

A fourth aspect of the invention comprises, a method of generating at an interactive voice recognition server platform a packetised data stream, each packet in the data stream being arranged to enable the client platform to perform steps in the method as claimed in any previous method aspect, the method comprising at the IVR server platform performing the steps of:
  generating a content segment identifier for each packet to be transmitted to the client;
  logically associating said content segment identifier with a sequentially content segment previously transmitted in the sequence of content segments sent by the server platform to said client platform in said packetised data stream; and
  transmitting said packet carrying said encoded speech data, said sequence identifier and one or more of said content segment identifiers to said client platform, whereby the client platform receiving said packetised data stream is enabled to perform a method according a previous method aspect.

Preferably, the server platform further performs the steps of:
  generating a codec identifier for encoding data carried by each said packet to said client platform, wherein said codec identifier indicates the encoding scheme the client platform uses to encode subsequent packets sent to said server platform.

Preferably, said codec is determined by the server responsive to processing a packet previously received from said client platform.

Preferably, the codec is generated responsive to the server predicting a change in the grammar complexity of a speech response by the client platform to the next interactive voice prompt sent by the server platform to the client platform.

Preferably, the codec is generated responsive to the server platform not recognising the current response sent by the client platform.

A sixth aspect of the invention seeks to provide a method of selecting a codec to enable speech recognition to be performed in an interactive voice recognition system comprising at least one VOIP client platform arranged to communicate over at least one wireless VOIP link with a VOIP server platform, the method comprising the steps of:

predicting from the encoding of a received speech segment transmitted from the client platform to the server platform a future grammar complexity for a future speech segment to be received in an encoded form from said client platform responsive to a prompt provided by said IVR of said server platform;

determining if the encoding to be used in said future speech segment to be received by said server platform can be optimised responsive to a change in grammar complexity being predicted by said server platform;

generating a new codec to be used by the client platform for said future speech segment in dependence on the predicted grammar complexity of said future speech segment; and transmitting said codec to said client platform in at least one packet forming a data stream arranged to generate said prompt at said client platform, whereby said client platform is able to encode subsequent speech segments.

@ Preferably, the codec is further selected by the server platform performing the steps of:

detecting that a received speech segment transmitted from the client platform to the server platform has generated a mis-recognition event at the server platform.

A seventh aspect of the invention comprises apparatus arranged to determine the speech content of a packet carrying speech encoded data missing from speech segment communicated by in a packetised data stream communicated using at least one VOIP link between a server platform and the apparatus, the apparatus comprising:

means for receiving a plurality of packets carrying speech encoded data forming said packetised data stream;

means for processing each received packet to determine a unique message segment identifier associated with a speech segment of the received packet;

means for processing each received packet to determine if it contains another unique message segment identifier associated with a previously received packet carrying encoded speech data;

means for determining if the unique message segment identifier for the received packet exists in storage means provided on the client platform, and if not, storing the received packet in association with its unique message segment identifier;

means for processing each received packet to determine a sequence identifier;

means for checking if the sequence identifier is contiguous in sequence with a previously received packet stored locally on said client platform, and if not, determining the speech content of one or more missing packet in the sequence sent by the server platform to the client platform by retrieving a packet from said storage means having the same unique message segment identifier as the missing packet.

Preferably, the apparatus according to the seventh aspect is arranged to perform steps in any method aspect as appropriate.

An eighth aspect of the invention comprises a VOIP interactive voice recognition server platform arranged to generate a packetised data stream, each packet in the data stream being arranged to enable the restoration of one or more packets found missing from the stream at a receiving VOIP client platform, the VOIP server comprising:

mean for generating a message segment identifier for each packet to be transmitted to the client;

means for logically associating said message segment identifier with a message segment identifier for a previously sequenced packet transmitted to said client in said packetised data stream; and means for transmitting said packet carrying said encoded speech data, said sequence identifier and said message segment identifier to said client.

A ninth aspect of the invention comprises an interactive voice recognition system comprising at least one VOIP client platform arranged to communicate over at least one wireless VOIP link with a VOIP server platform, the system comprising:

means for predicting from the encoding of a received speech segment transmitted from the client platform to the server platform a future grammar complexity for a future speech segment to be received in an encoded form from said client platform responsive to a prompt provided by said IVR of said server platform;

means for determining if the encoding to be used in said future speech segment to be received by said server platform can be optimised responsive to a change in grammar complexity being predicted by said server platform;

means for generating a new codec to be used by the client platform for said future speech segment in dependence on the predicted grammar complexity of said future speech segment; and means for transmitting said codec to said client platform in at least one packet forming a data stream arranged to generate said prompt at said client platform, whereby said client platform is able to encode subsequent speech segments.

A tenth aspect of the invention comprises an interactive voice recognition system comprising at least one VOIP client platform arranged to communicate over at least one wireless VOIP link with a VOIP server platform, the system comprising:

means for detecting that a received speech segment transmitted from the client platform to the server platform has generated a mis-recognition event at the server platform;

means for generating a new codec to be used by the client platform for said future speech segment in dependence on the predicted grammar complexity of said future speech segment; and means for transmitting said codec to said client platform in at least one packet forming a data stream arranged to generate said prompt at said client platform, whereby said client platform is able to encode subsequent speech segments.

An eleventh aspect of the invention comprises a suite of one or more computer programs arranged to perform any one of the method aspects.

Preferably, the suite of computer programs is distributed to form an interactive voice recognition system.

A twelfth aspect of the invention seeks to provide a method of optimising the streaming content of a voice over internet protocol interaction between a interactive voice recognition server and a mobile client platform, the method comprising the steps of:

at the server:
  determining a codec for encoding a subsequent speech segment responsive to the perceived quality of a received speech segment;
  transmitting an identifier for the codec to the client platform in a packet including a speech segment comprising a prompt generated by the interactive voice recognition server;
at the client:
  processing the received packet to extract the identifier for the codec;
  encoding a speech segment responsive to the prompt using said identified codec; and
  transmitting over at least one wireless VOIP link a packet carrying said encoded speech segment.

A thirteenth aspect of the invention seeks to provide an IVR system arranged to optimise the speech quality streaming content of a voice over internet protocol interaction between a interactive voice recognition server and a mobile client platform, the system comprising:
  a server comprising:
  processing means arranged to determine a codec for encoding a subsequent speech segment responsive to the perceived quality of a received speech segment;
  means to transmit an identifier for the codec to the client platform in a packet including a speech segment comprising a prompt generated by the interactive voice recognition server; and
  at least one mobile client platform comprising:
  processing means arranged to process the received packet to extract the identifier for the codec;
  coding means arranged to encode a speech segment responsive to the prompt using said identified codec; and
  means arranged to transmit over at least one wireless VOIP link a packet carrying said encoded speech segment.

The above statements representing the aspects and preferred features of the invention, including those set out in the attached claims, may be appropriately combined in any manner apparent to one skilled in the art.

BRIEF DESCRIPTION OF DRAWINGS

The preferred embodiments of the invention will now be described with reference to the accompanying drawings which are by way of example only and in which.

DETAILED DESCRIPTION OF PRESENT EXAMPLE EMBODIMENTS

The best mode of the invention will now be described with reference to the accompanying drawings. Those skilled in the art will appreciate that the accompanying figures show exemplary embodiments of the invention which may omit to describe certain (e.g. non-essential) features and functional equivalents where such features/functions are apparent to those skilled in the art for implementing the invention in practice.

Figure 1:
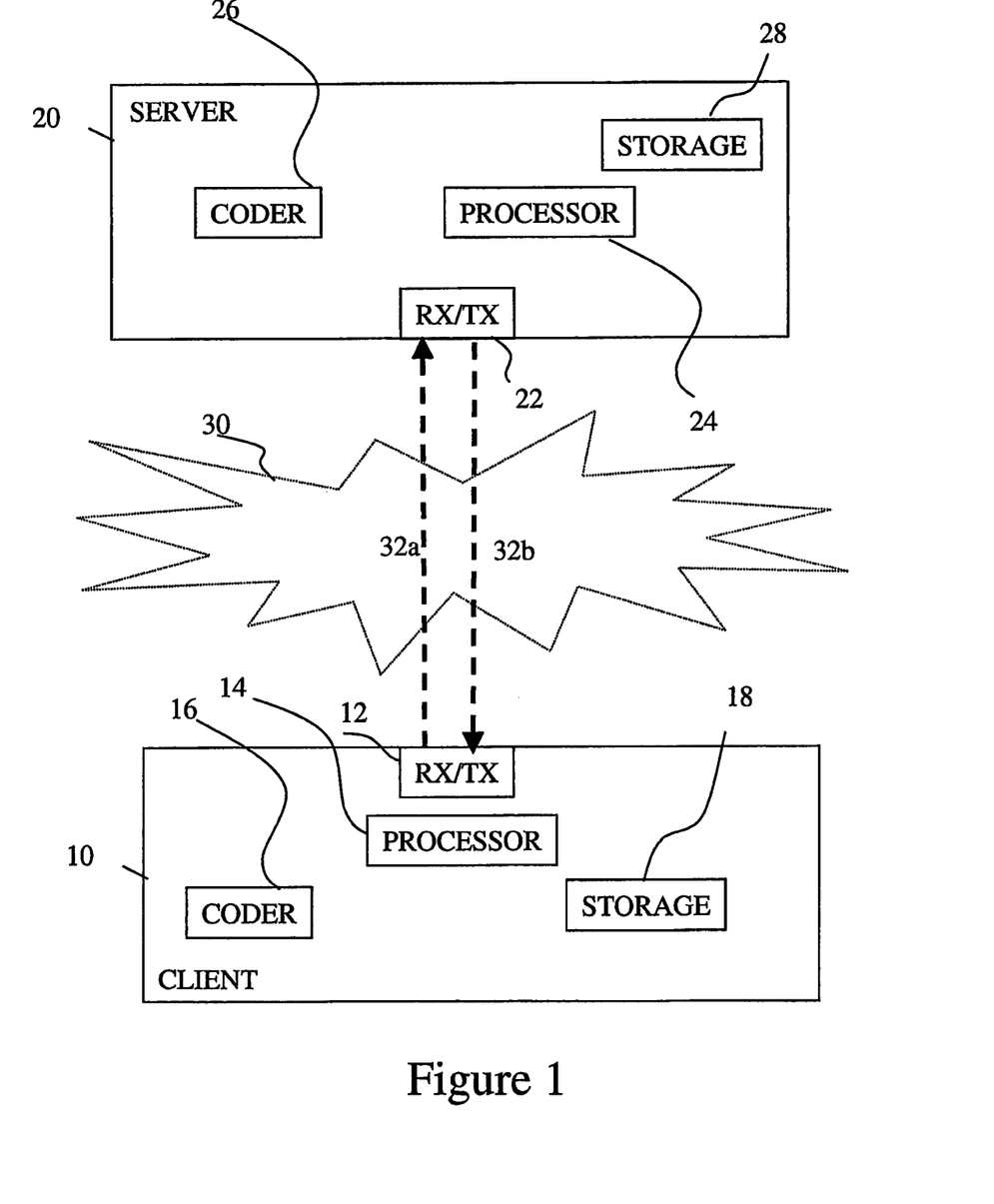
FIG. 1 shows schematically a VOIP client-server optimisation system according to one embodiment of the invention.

Referring now to FIG. 1 of the accompanying drawings, a client-server VOIP system is shown in which a VOIP client platform 10, for example a mobile device such as a mobile phone, is arranged to communicate with a VOIP server platform 20 over a communications network 30. The term platform is used herein to denote an appropriate arrangement of hardware and/or software which enables the desired functionality of the system. The client platform 10 and server platform 20 each include appropriate hardware and software arranged to support a VOIP mode of communication such as are well known to those skilled in the art. Communications network 30 supports VOIP traffic between the server 20 and client 10 over at least one VOIP link 32, which may be a bidirectional link 32a,32b such as is shown in FIG. 1. In a preferred embodiment of the invention, VOIP communications network 30 comprises different transmission segments including at least one wireless link (not shown) between the VOIP client 10 and the VOIP server 20. The term VOIP data is intended to include VOIP packets carrying data such as, for example, encoded speech packets.

VOIP client platform 10 comprises appropriate VOIP data receiving means and transmitting means, shown as RX/TX means 12 in FIG. 1 of the accompanying drawings. RX/TX means 12 comprises appropriate means arranged to enable the VOIP client platform to communicate over a VOIP communications network 30 with VOIP server 20 such as are well known to those skilled in the art. VOIP client platform 10 also includes processing means 14 arranged to process received VOIP data in the manner hereinafter described with reference to FIG. 3 of the accompanying drawings. Returning now to FIG. 1 of the accompanying drawings, VOIP client platform 10 further includes appropriate coding means 16 to perform an encoding/de-encoding operation on received/transmitted data. This operation is done using a hash code extracted from incoming speech packets by the processor means 14. Storage means 18 provides a caching facility for the VOIP data.

Figure 3:
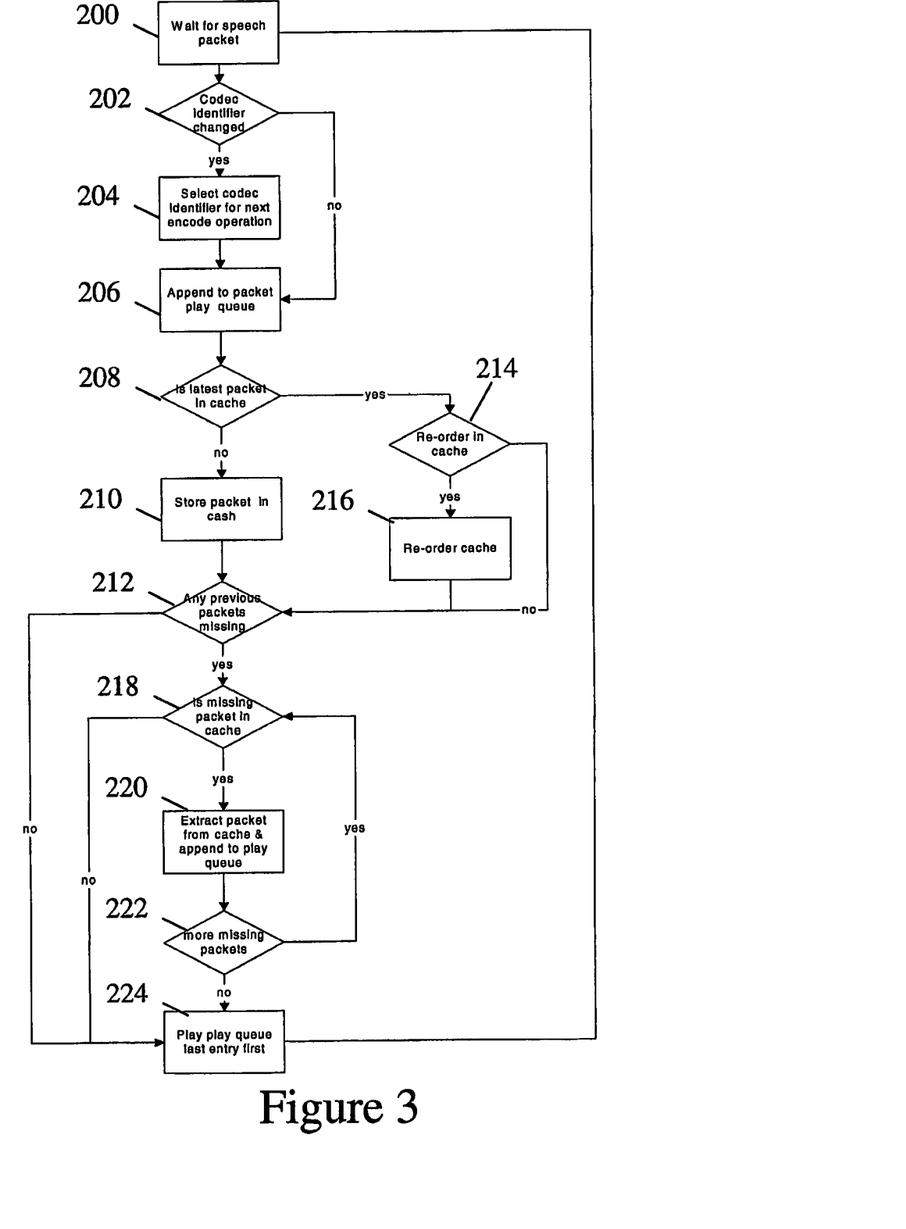
FIG. 3 shows schematically client-side processing according to an embodiment of the invention.

The client 10 does not generate the hash codes from the incoming VOIP speech packets (the server 20 carries out this function before it sends the VOIP packets to the client). The client just extracts the hash codes from the incoming encoded speech packets headers. Accordingly, only the server platform 10 generates the hash codes. Optionally, the hash code can be encrypted in some embodiments of the invention. More detail of the client side processing operation is shown in FIG. 3 which is described later herein below.

FIG. 1 also shows a VOIP server platform 20, for example, an Interactive Voice Recognition (IVR) server platform which is provided with appropriate receiving/transmitting means shown as RX/TX 22 for VOIP communication over the communications network 30 with VOIP client platform 10. IVR VOIP server platform 20 also comprises appropriate processing means 24 arranged to process VOIP encoded speech packets (as in FIG. 2) and coding means 26 carries out the encoding and decoding of speech packets from one codec form to another e.g. AMR mode 1 to G.711 (mulaw). Processing means 24 is arranged to carry out the functionality given in FIG. 2. The server shown in FIG. 1 further comprises a storage component (28). The storage component 28 stores file based speech that the IVR can (depending on what prompts it decides to play in an Interactive Dialog) send (after processing through 24 and 26) to the client platform 10.

Figure 2:
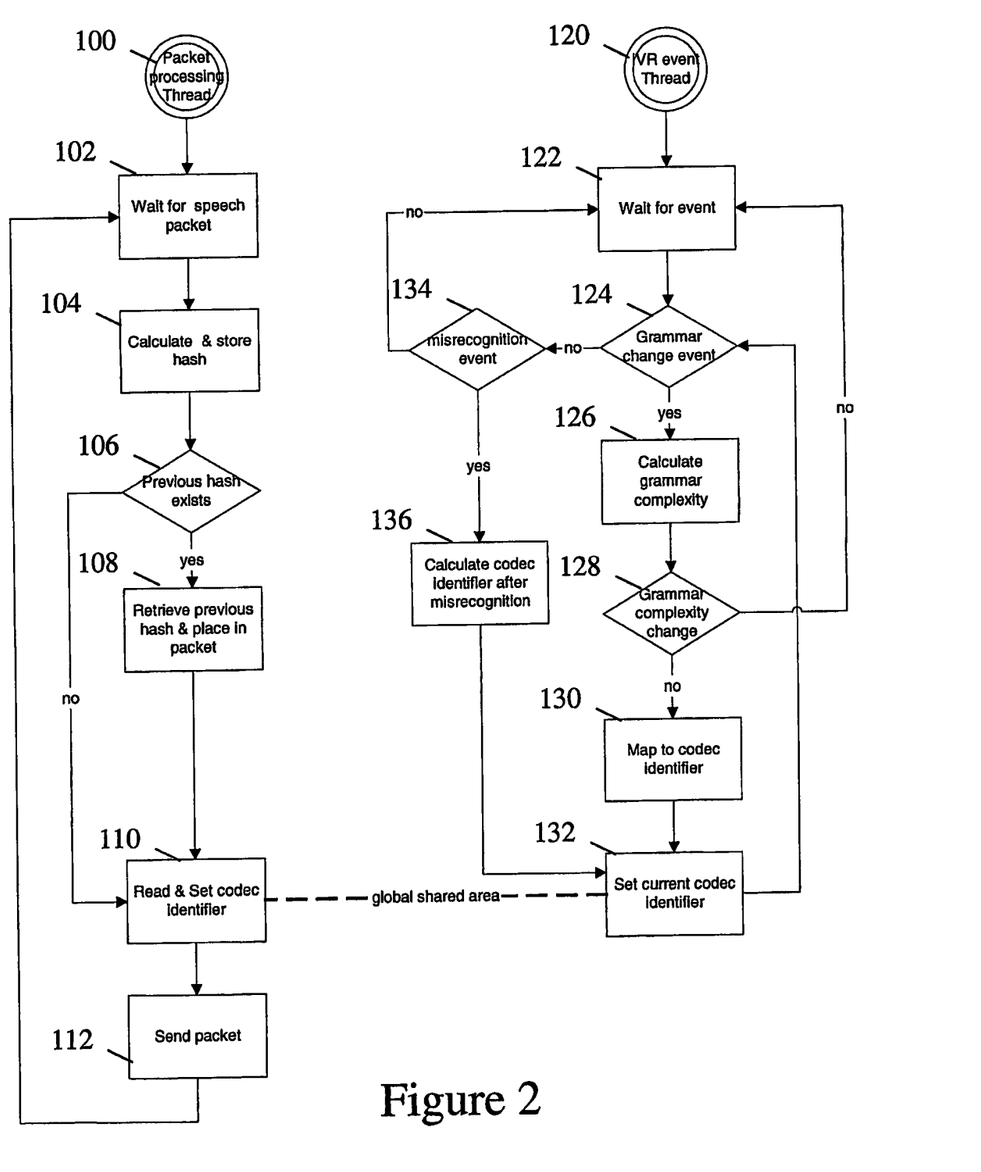
FIG. 2 shows schematically server-side processing according to an embodiment of the invention.

FIG. 2 shows in more detail the processing operations performed by an embodiment of the invention in which VOIP server platform 20 comprises an IVR VOIP server platform 20. In FIG. 2, the processing means 24 is arranged to perform at least two threads of operation for the IVR functionality, respectively a packet processing thread 100 and an IVR event thread 120.

The packet processing thread 100 comprises a wait for next speech packet function 102. It is assumed that each speech packets contains one or more speech frames. In embodiments of the invention which implement frame based processing, the hash code is associated with a frame and not a packet (multiple frames).

When processing means 24 receives a speech packet from the IVR server platform, the speech packet is decoded and then passed to either the same processing means 24 or other processing means (as shown in FIG. 2) which is arranged to generate a hash code providing a unique identifier for the received speech segment carried by that packet.

According to a preferred embodiment of the invention, the hashing algorithm produces a repeatable N-bit identifier for each identical series of M-bits in the speech packet. In the best mode of the invention currently contemplated by the inventor, the hashing algorithm produces a flat distribution across all possible $2^N$ hash codes when operating on a non-repeating stream of speech packets. In practice, as the complexity of the hashing algorithm increases as the distribution curve flattens, it is anticipated that some curvature will remain according to the requirements of the system designers.

If N is large, there is less chance for a duplicated hash code but this is at the cost of the actual data providing the hash being larger, i.e., more data needs to be sent with each speech packet describing the hash. Another feature affecting the distribution of hash codes is the codec used on the speech. Generally, the lower the bit-rate codec, the flatter the distribution so AMR modes (0-7) encoded speech produces a flatter distribution than G.711 encoded speech. The Adaptive Multi-Rate (AMR) codec is a used as a generic term for a series of Codecs. The AMR codec uses eight source codecs with bit-rates of 12.2, 10.2, 7.95, 7.40, 6.70, 5.90, 5.15 and 4.75 kbit/s. The codec is based on the code-excited linear predictive (CELP) coding model.

In the currently preferred embodiment of the invention, the hashing algorithm carries out an Exclusive OR operation across N=16 bit integers across the whole AMR encoded speech packet in a manner known to those skilled in the art, for example, in a similar way to the way in which Cyclic Redundancy Checks (CRCs) are produced (for example, see "Efficient Hardware Hashing Functions for High Performance Computers", IEEE Transactions on Computers Volume 46, Issue 12 (December 1997), page 1378-1381, 1997, ISSN: 0018-9340, by M. V. Ramakrishna, E. Fu, and E. Bahcekapili; and "Understanding Cyclic Redundancy Check" by Ruffin Scott, ACI Technical Support, Technical Note 99-11, Technical Notes March 1999, http://www.4d.com/docs/CMU/CMU79909.HTM). This produces a 16-bit integer hash code that is placed in the packet header of the next speech packet sent.

In an alternative embodiment of the invention, instead of hashing each packet of data to provide it with a unique identifier, coding framing information into the hash code could be performed. Advantageously, this enables the VOIP client to play out individual frames from cache in a manner described in more detail herein below. In a frame based embodiment of the invention where each packet of data contains X number of frames, the server processing means 24 would generate a hash code for every frame in the packet and place the X hash codes generated into the speech packet before sending it off to the client platform 10. The client platform 10 processes each Frame as a unit of speech for caching as opposed to a Packet of speech.

After generating the hash code for the current speech packet various pieces of information are placed into the packet header before sending on to the Client:
i) the current hash code dust generated),
ii) the hash code of the previous speech packet (if any),
iii) a packet sequence number and
iv) a codec identifier (see below).

The IVR event-processing thread 120 comprises firstly a wait for event 122 function that waits for certain predetermined IVR events to arrive from the IVR platform. Function 102 thus waits for a speech packet from the IVR server platform 20 and not from the client platform 10.

Suitable events which are processed according to the invention include events which indicate the current codec bit-rate may need updating, for example, a grammar change event 124 or a misrecognition event 134. A grammar change event 124 occurs when the IVR dialog changes its current grammar. A misrecognition event 126 occurs when the user is re-prompted for a response after the recogniser misrecognises the previous response.

In the event of a grammar change event 124 being detected, the IVR thread calculates the grammar complexity 126 of the new grammar. The grammar complexity calculation can be done using known techniques and may be quite simple. For example, a manually configured complexity value could be supplied when the dialog was developed and the complexity value for the new grammar simply used. Alternatively, the grammar complexity may be automatically determined in a dynamic manner by counting the number of words in the vocabulary of the new grammar and then mapping the number of words to a complexity value. Alternatively, the grammar complexity may be determined by looking at the expected specific word responses used in the grammar.

If, despite a grammar change, the resulting grammar complexity is unchanged, there is no need to update the codec used. However, if a grammar complexity change 128 is present, then mapping function 130 is performed.

The mapping function 30 takes the grammar complexity value and maps it to a codec identifier using any appropriate mapping calculation such as one known to those skilled in the art. Finally a set current codec identifier 132 function is performed which changes the current codec so that the packet processing thread is able to retrieve it and place it into speech packet headers to be sent to the client.

In the event of the wait for event function 122 determining that the event is a misrecognition event, a new codec is calculated 136 after the misrecognition event 134 has been determined. Whilst FIG. 2 shows an event being determined as a misrecognition event after the event has been determined not to be a change grammar event, those skilled in the art will appreciate that the sequence shown in which a misrecognition event is determined only after non-detection of a change grammar event can be changed in other embodiments of the invention.

The recalculation of the codec function 136 is responsive to a misrecognition event 134 having been detected. The codec recalculation will normally raise the codec bit-rate to improve the chances of recognition of the next response to an IVR prompt that the user provides via the VOIP client.

Referring now to FIG. 3 of the accompanying drawings, details of the VOIP client side processing are shown schematically at a functional level. Firstly, the VOIP client 10 processing means 14 performs a function Wait for Speech Packet 200 from the VOIP IVR server platform 20. The processing means 14 remains in a wait state until speech packets arrive at RX/TX 12 via link 32 from server 20.

As each packet arrives, it is processed by processing means 14 provided by the VOIP client 10 to extract data, for example header information. If the processing means 14 determines that the codec identifier identified in the packet header has changed from a previous stored value or is otherwise determined to be new, then the client performs a function 202 to determine if the codec identifier has changed.

If the codec has changed, a function 204 is performed to determine a new codec identifier which is then used by coding means 16 for all future encode operations (unless updated by a new codec being identified at some point). If the current codec has not changed from a previous value, then the same codec is used by the coding means 16 to encode speech packets sent by the VOIP client 12 to the VOIP server 20.

The client processing next performs function 208 comprising an append packet to play queue function. VOIP client 10 maintains a play queue arranged to store a list of speech packets. According to one embodiment of the invention, storage means (not shown) is arranged to play packets out in a last in first out (LIFO) order, such that the latest packet received is placed first in a queue. If, subsequently, any missing packets are retrieved from cache storage means 18 shown in FIG. 1, these are added to the head of the queue. At the end of the process the queue holds a list of packets to be played in the correct order.

Storage means (e.g., cache) 18 holds a pool of speech packets (including hash codes) received by the VOIP client 10. New packets are added to the storage means 18 when they are received by the client performing function 208 which determines if the latest packet is already in storage means 18. If not, then the packet is stored 210 in storage means 18. If the packet is already stored in storage means 18, a function is performed to determine if the storage means 18 requires updating 214. If an update is required, the storage means 18 is updated by a reordering function 216 that reorders the packets in the storage means 18.

If the storage means 18 reaches a configurable limit in size an appropriate ageing algorithm known to those skilled in the art determines which entries in the storage means should be removed before the new packet is added. Examples of suitable ageing algorithms include algorithms arranged to update the storage means on the basis of first in first out (FIFO), last in first out (LIFO), least frequently used, most frequently used etc.

The client then determines if any previous packets are missing 212 (for example, by checking the sequence information provided in the packet header). Packets are determined as missing when the difference between the sequence number of the latest speech packet is greater than one more than the sequence number of the last packet received. The VOIP Client can then determine if one or more packets are missing and searches storage means 18 for the missing packets to locate as many as it can find. This is done by iterating the process 218 to 222 shown in FIG. 3 of the accompanying drawings in the preferred embodiment of the invention.

In FIG. 3, when a packet is lost the Client searches the storage means 18 for the packet's hash code (the lost packets hash code is retrieved from the currently processed speech packet header by looking at the previous packets hash code value). Function 218 determines if the missing packet is stored in storage means 18 using any appropriate method known to those skilled in the art. Any appropriate cache searching process could be used to search the memory means 18 such as, for example, a binary search, indexed search, most frequently used search etc.

If a missing packet is found in the storage means 18 cache it is added to the play queue (alternatively known as the prompt queue) by function 220 and the packet's used count is then incremented. If one exists, functions in one embodiment of the invention, the memory means 18 ageing algorithm exploits the packet's used count to determine the packet "age" value.

If another packet is missing 222 the process from 218 to 222 in FIG. 3 is repeated. When no more packets are determined to be missing, the VOIP client plays the play queue last entry first and the client processing means 14 returns to a state associated with wait for speech packet function 200.

The invention enables a VOIP client to communicate more effectively with a VOIP server by enabling the VOIP server to predict what codec the VOIP client should use for sending speech data. A VOIP server is often able to anticipate what kind of speech segment may be sent in response, i.e., whether a number or a speech string, and whether the speech string may comprise a simple "yes" or "no" response or a longer response such as someone's address or even just the name of a town. Accordingly, the VOIP server can determine if the response it likely to require a high quality of service so that, for example, in response to an IVR prompt "Please say the name of your town", the IVR predicts that the name of a town speech segment sent by the client should be encoded with a high bit-rate codec. This codec would be more complex than a codec which simply encodes a speech segment which is sent by the VOIP client in response to an IVR prompt "Are you resident in the United Kingdom?" to which a simply "yes" or "no" response would be expected. If however, the user did not understand the question, and responded with a different answer, a misrecognition event may be triggered, in which case the client may be asked to use a more complex codec, despite the desired response "yes" or "no" not requiring one.

The invention thus enables a method of predicting an optimal hash function for encoding speech segments for transmission over a VOIP communications link where it is assumed that the IVR VOIP server is able to anticipate what is likely to provide optimum hash for a particular speech segment.

The cache mechanism of the invention is arranged to enable the client platform to retrieve lost data packets from a local store when an IVR server platform has sent a sequence of speech encoded packets. By storing the hash values for previously sent packets in a local store on the VOIP client platform, however, the VOIP client platform is able to easily and quickly determine what speech segments are missing and restores them in the stored sequence without having to request them to be resent by the VOIP server platform. Advantageously, this enables a reduction in lag times for communications between the VOIP server and client, as the client platform is able to replace missing packets by retrieving them from a cache provided by the client platform. This enables sections comprising one or more missing speech segments to be replaced more rapidly than if the client has to request the server to resend the missing data. This aspect of the invention exploits the fact that in an IVR interaction, speech segments may be repeated, in particular, exactly identical speech segments may be repeatedly sent by the IVR server to the client. It is also possible, although less likely, for the client to repeat the same speech segments to the IVR server. It is therefore advantageous if each speech segment encoded in a single packet is relatively unique. This means that when a client receives a packet and processes it to extract the unique identifier (i.e., the hash code) for the packet it is able to search its local cache to determine if the packet has already been stored in the local cache. If so, then the packet received is not stored in the cache, if not, then the packet is stored with its hash in the cache. The packet stored will still be associated with a hash for the previous packet in the sequence.

If a packet is received which has a sequence number which indicates one or more packets in the sequence sent by the IVR platform are missing, for example, if the difference between the sequence numbers of the latest received packet and the previously receive packet is greater than one, the client is able to retrieve the missing packets by searching its cache for a packet with the same hash code as the hash code for the previously sent packet (which is missing). If the missing hash code is in the cache, then this can be used to extract a replica of the previous speech encoded packet in the sequence from the cache. The packet can then be processed to determine if any more packets are missing from the sequence by examining the sequence number. If the sequence number indicates another packet is missing, then the process is repeated until eventually the entire sequence is replaced using cached packets held on the local cache of the client machine. If, however, the client fails to find a packet with the same hash code as the current packet indicates for the previous packet in cache, then the client will not be able to use the local cache to replace the missing packet. In this case the quality suffers as the latencies over GPRS inhibit requesting packets to be resent by the Server as the delay is generally unacceptable.

A method, system and apparatus which determines the speech content of a packet carrying speech encoded data is thus provided by the invention to enable speech content to be retrieved from a cache if a packet containing said speech content is missing from a packetised data stream received by a client or if the speech content does not meet a predetermined criterion for valid reception at the client platform. The data stream is communicated using at least one VOIP link between a server platform and apparatus providing a client platform. The VOIP link is usually supported by a connectionless communications link, but intermediate connection-oriented communications protocols may support connection-oriented IP in alternative embodiments of the invention.

The invention enables a client platform to maintain the content quality of streamed content received from a remote server platform, even if the quality of transmission over one or more connecting communications links vary. For example, variation can occur due to the communications protocol characteristics (which may result in packets being dropped, e.g. due to their assigned priority), or be due to network (e.g., congestion/delays resulting in packets being dropped) or other environmental factors, such as can occur when a wireless communications link is utilised to convey the content stream between the server and a client platform.

Those skilled in the art will appreciate there are many possible types of suitable client platforms and server run applications which could be utilised to generate content capable of appropriate segmentation, for example, such content comprising messages generated by an Interactive Voice Recognition system server and streamed to a client. Examples of a client platform include a mobile client apparatus such as a mobile communications device, e.g., a mobile telephone or other portable data processing type equipment (e.g., a PDA, or portable computer etc) which capable of receiving data from a data source or any other communications device arranged to transmit and receive data over at least one wireless link).

In IVR systems, the data may be transmitted and/or received as VOIP data packets containing speech content, e.g. each segment comprising a message segment. Alternatively, the data may comprise other data which is likely to contain repetitive content. The content segments may vary in size, quality, priority, and bandwidth requirements.

Although the embodiments described hereinabove focus on IVR applications of the invention; the invention enables any content to be recovered at a client platform. However, the server generating the content must be capable of segmenting the content into at least some segments which are repeated either during an individual user session or repeated during the course of several user sessions. If repeated during a single session, each content segment needs only be stored in appropriate short term memory at the client platform, whereas if likely to be repeated over several sessions, longer term memory needs to be utilised.

The invention thus has application when repetitive content is sent over any communications link which is capable of supporting a connectionless data packet connection and can be stored wholly or in part on a receiving client machine in association at least a packet identifier and a content segment identifier, together with one or more sequence identifiers to identify a received packet/content segment in the context of the previously contiguously sent packet/content segment.

The sequence identifier enables the client platform to determine from a sequence of received data packets when a data packet has not been received by the client platform. This means that the client platform can determine when a data packet has not been received, enabling the data packet to be identified and/or the content of that data packet to be determined at the client platform.

Each sequence identifier for a data packet is capable of being associated with the temporally adjacent data packets, more than one data packet can be omitted and the entire omitted sequence of a plurality of data packets deduced. In this way, as the data content of each data packet which the client platform has failed to receive (or which has not been processed correctly following reception to determine its data content), a sequence of missing content can be determined by performing a sequential lookup of stored data content for each missing content segment, as the stored content segment will also provide a link to the content received previously from a packet sequentially adjacent to the initial missing packet (as determined from a previously (historic) received sequence of data packets). This sequentially previous packet will itself be associated with a previous sequential packet, and so on, enabling an entire missing sequence of packets (or equivalently content segments) to be determined. A cut-off can be set for the number of times the process is repeated either as by the number of packets/content segments, or if any identifier in the chain of packets/segments matches the last successfully received packet, which indicates the full content stream is likely to have been restored.

The client platform apparatus can comprise separate or integrated components which serve as means for:
  i) receiving a plurality of packets carrying encoded content data forming said packetised data stream;
  ii) processing each received packet to determine a unique message segment identifier associated with an content data segment of the received packet;
  iii) processing each received packet to determine if it contains another unique message segment identifier associated with a previously received packet carrying encoded content data;
  iv) determining if the unique message segment identifier for the received packet exists in storage means provided on the client platform;
  v) storing the received packet in association with its unique message segment identifier in the case where it is determined the message segment has not been already stored by virtue of its presence in a previously received packet;
  vi) processing each received packet to determine a sequence identifier;
  vii) checking if the sequence identifier is contiguous in sequence with a previously received packet stored locally on said client platform;
  viii) determining the content of one or more missing packet in the sequence sent by the server platform to the client platform by retrieving a packet from said storage means having the same unique message segment identifier as the missing packet.

As previously mentioned, although in the preferred embodiment of the invention, the encoded content data comprises encoded speech data, and the content comprises speech, in other embodiments of the invention, the encoded content data comprises any data segment sent repetitively from a server generating content to be streamed to a client, and is thus not limited to only speech segments which are sent repetitively from an IVR server to a client.

Those skilled the art will appreciate that appropriate processing means may be arranged in use to perform more than one of the above functions.

The above embodiments demonstrate how a method and system of optimising the streaming content of a voice over internet interaction between a interactive voice recognition server and a mobile client platform is also provided by the invention. The server platform thus determines a codec for encoding a subsequent speech segment responsive to the perceived quality of a received speech segment, and transmits an identifier for the codec to the client platform in a packet including a speech segment comprising a prompt generated by the interactive voice recognition server. The client platform processes the received packet to extract the identifier for the codec, and encodes a speech segment responsive to the prompt using said identified codec, and then transmits over at least one wireless VOIP link a packet carrying said encoded speech segment.

Those skilled in the art will appreciate that many alternatives and functional equivalents exist corresponding to the features described herein above and that the invention is not limited to the specific features and embodiments described herein above but is instead defined by the scope of the accompanying claims.

The invention claimed is:

1. A method of maintaining the quality of speech recognition in an interactive voice recognition system comprising at least one client platform arranged to communicate over at least one communications link, capable of supporting a connectionless data packet connection, with an interactive voice recognition server platform, the method comprising the steps of:
predicting a grammar complexity for a future speech segment to be received in an encoded form from said client platform responsive to a prompt provided by an IVR application running on said server platform; and
determining if the encoding to be used in said future speech segment to be received by said server platform can be optimised if said prediction indicates a change in grammar complexity, and if so:
generating based on the predicted grammar complexity of said future speech segment a new codec to be used by the client platform for encoding of said future speech segment;
transmitting said new codec to said client platform in at least one packet forming a data stream arranged to generate said prompt at said client platform; and
commanding said client platform to encode subsequent speech segments with said new codec.

2. A non-transitory computer readable medium storing one or more computer programs, which upon execution by a computer, performs the method of claim 1.

3. A method as claimed in claim 1, wherein the communications link comprises a wireless communications link.

4. A method as claimed in claim 1, wherein the connectionless data packet connection comprises the Internet Protocol.

5. A method as claimed in claim 1 wherein the communications link comprises a Voice Over Internet Protocol (VoIP) communications link.

6. A method of maintaining the quality of speech recognition in an interactive voice recognition system comprising at least one client platform arranged to communicate over at least one communications link, capable of supporting a connectionless data packet connection, with an interactive voice recognition server platform, the method comprising the steps of:
detecting that a received speech segment transmitted from the client platform to the server platform has generated a mis-recognition event at the server platform;
as a consequence of said mis-recognition event generating a new codec to be used by the client platform for encoding of a future speech segment in dependence on a predicted grammar complexity of said future speech segment;
transmitting said new codec to said client platform in at least one packet forming a data stream arranged to generate a prompt at said client platform; and
commanding said client platform to encode subsequent speech segments with said new codec.

7. An interactive voice recognition system comprising at least one client platform arranged to communicate over at least one communications link, capable of supporting a connectionless data packet connection, with an interactive voice recognition server platform, the system comprising:
a processor configured to:
predict grammar complexity for a future speech segment to be received in an encoded form from said client platform responsive to a prompt provided by said interactive voice recognition system;
determine if the encoding to be used in said future speech segment to be received by said server platform can be optimised if a change in grammar complexity is predicted by said server platform; and
generate a new codec to be used by the client platform for encoding of said future speech segment based on the predicted grammar complexity of said future speech segment; and
a transmitter configured to transmit said new codec to said client platform in at least one packet forming a data stream arranged to generate said prompt at said client platform, and commanding said client platform to encode subsequent speech segments with staid new codec.

8. An interactive voice recognition system as claimed in claim 7, wherein the processor is configured to: detect that a received speech segment transmitted from the client platform to the server platform has generated a mis-recognition event at the server platform.

* * * * *